United States Patent Office 3,586,713
Patented June 22, 1971

3,586,713
AMIDES AND N-HYDROXYAMIDES OF SUBSTITUTED ARYLACETIC ACIDS AND CORRESPONDING SALTS
Nguyen Phuc Buu-Hoi, Hue, Vietnam, and Georges Emile Lambelin, Claude Leon Gillet, Jacques Emile Thiriaux, and Georges Joseph Mees, Brussels, Belgium, assignors to Madan AG, Chur, Switzerland
No Drawing. Continuation-in-part of application Ser. No. 598,174, Dec. 1, 1966. This application Nov. 5, 1968, Ser. No. 773,623
Claims priority, application Belgium, Dec. 9, 1965, 673,495; Nov. 7, 1966, 689,347
Int. Cl. C07c 83/00; A61k 9/02, 25/00
U.S. Cl. 260—500.5           9 Claims

ABSTRACT OF THE DISCLOSURE

A new group of amides and N-hydroxyamides of substituted arylacetic acids of the formula:

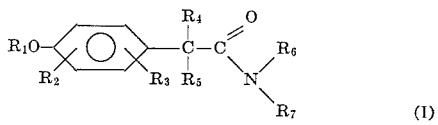

(I)

wherein:

$R_1$ represents linear or branched alkyl $C_1$–$C_8$, linear or branched alkenyl $C_3$–$C_4$, linear or branched alkynyl $C_3$–$C_4$, cycloalkyl $C_5$–$C_6$ or cycloalkenyl $C_5$–$C_6$;

$R_4$ and $R_5$ being identical or different, represent hydrogen, linear or branched alkyl $C_1$–$C_4$, cycloalkyl $C_5$–$C_6$, hydroxy or dialkylaminoalkyl;

$R_2$ and $R_3$ represent either both halogens, or halogen and hydrogen, or halogen and alkyl or both hydrogen but, in this case, only when one or both $R_4$ and $R_5$ are different from hydrogen;

$R_6$ and $R_7$ are either identical or different members of the group comprising: hydrogen, linear or branched alkyl $C_1$–$C_4$, dialkylaminoalkyle, hydroxyalkyle $C_1$–$C_4$ and phenylalkyle (alkyl $C_1$–$C_4$), or $R_6$ represents hydroxy radical while $R_7$ represents hydrogen, or $R_6$ and $R_7$ form together with the nitrogen atom a heterocyclic ring, said new compounds, including alkali or alkaline-earth metal salts and ammonium salts of N-hydroxyamides, possess a combination of antipyretic, anti-inflammatory, analgesic and antispasmodic properties.

---

This application is a continuation-in-part of our copending application Ser. No. 598,174, filed Dec. 1, 1966 and now abandoned.

This invention relates to use in pharmaceutical field of new amides and N-hydroxyamides of substituted arylacetic acids and of new alkali or alkaline-earth metal salts and ammonium salts of said N-hydroxyamides.

At the present time, a substantial proportion of pharmacological research on the cure or mitigation of rheumatoid conditions is directed to synthesis of new non-steroid compounds having strong anti-inflammatory activity.

As explained below, the new compounds according to this invention have an anti-inflammatory, analgesic, antipyretic and antispasmodic activity with other desirable subsidiary activities more-or-less related thereto.

The new amides and N-hydroxyamides of substituted arylacetic acids of the invention are represented by the following general formula:

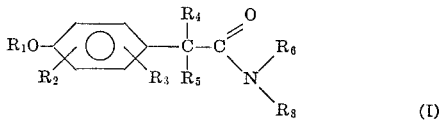

(I)

wherein:

$R_1$ represents linear or branched alkyl $C_1$–$C_8$, linear or branched alkenyl $C_3$–$C_4$, linear or branched alkynyl $C_3$–$C_4$, cycloalkyl $C_5$–$C_6$ or cycloalkenyl $C_5$–$C_6$;

$R_4$ and $R_5$ being identical or different, represent hydrogen, linear or branched alkyl $C_1$–$C_4$, cycloalkyl $C_5$–$C_6$, hydroxy or dialkylaminoalkyl;

$R_2$ and $R_3$ represent either both halogens, or halogen and hydrogen, or halogen and alkyl or both hydrogen but, in this case, only when one or both $R_4$ and $R_5$ are different from hydrogen;

$R_6$ and $R_7$ are either identical or different members of the group comprising: hydrogen, linear or branched alkyl $C_1$–$C_4$, dialkylaminoalkyle, hydroxyalkyle $C_1$–$C_4$ and phenylalkyle (alkyl $C_1$–$C_4$), or $R_6$ represents hydroxy radical while $R_7$ represents hydrogen, or $R_6$ and $R_7$ form together with the nitrogen atom a heterocyclic ring.

The heterocyclic ring which may be formed by $R_6$ and $R_7$ with the N atom may be of the piperidino, morpholino or pyrrolidino type.

As general process for preparing N-hydroxyamides of Formula I, wherein $R_6$=H and $R_7$=OH, an alkyl arylacetate having the formula:

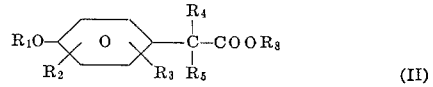

(II)

wherein $R_1$, $R_2$, $R_3$, $R_4$ and $R_5$ have the same meaning as above and $R_8$ represents an alkyl radical is reacted with hydroxylamine so as to obtain the corresponding N-hydroxyamide. When $R_4$=$R_5$=H in Formula II, the starting alkyl ester, for example ethyl or methyl ester, is obtained by treating by sulphur and a secondary base, such as morpholine, an acetophenone duly substituted in $R_1$, $R_2$ and $R_3$, hydrolyzing the resulting complex, for example with sodium hydroxide in ethanol, so as to obtain the corresponding arylacetic acid which is esterified, for example with hydrochloric or sulfuric acid in ethanol or methanol.

When $R_4$ and $R_5$ are different from H in Formula II, the starting ester is preferably prepared by one of the following methods:

(1) By condensing benzyl halide with alkaline cyanide, which gives arylacetonitrile which, in the presence of a strong base and an alkylating agent, gives α- or di-α-substituted arylacetonitrile. The latter is treated with an acid and an alcohol which gives desired ester;

(2) By starting from suitable acid which, in the presence of a strong base and an alkylating agent, gives an α- or di-α-substituted arylacetic acid which is esterified by an usual process;

(3) By starting from suitable amide which, in the presence of a strong base and an alkylating agent, gives α- or di-α-substituted arylacetic amide which, in the presence of an alcoholic medium, gives desired ester;

(4) By starting from a duly substituted aldehyde and an alkali metal cyanide in the presence of a strong acid to obtain corresponding cyanohydrine which is hydrolysed in the presence of an alcohol and a strong acid to give desired arylacetate ester.

As a general process for preparing amides of substituted arylacetic acids of Formula I ($R_6$ and $R_7$ being not a hydroxy radical), a compound of the formula:

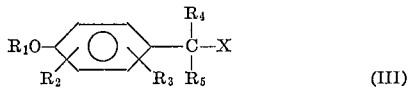

wherein $R_1$, $R_2$, $R_3$, $R_4$ and $R_5$ have the same meaning as above and X is a member of the group comprising the radicals: —CN, —COCl and —COOR' (R'=alkyl, such as $CH_3$ or $C_2H_5$) is treated so as to form an amide, i.e., when X represents —COOR' or —COCl in Formula III, this compound is treated with ammoniac, while when X represents —CN, this compound is hydrolyzed, so as to form the desired amide.

The procedure of preparation of a N-hydroxamide is set forth in detail in the following example for the preparation of N - hydroxy - 3,5 - dibromo - 4 - butoxyphenylacetamide. In this case, starting substituted acetophenone used in preparing starting alkyl arylacetate is obtained by condensing duly substituted p-hydroxyacetophenone with an alkyl halide.

EXAMPLE 1

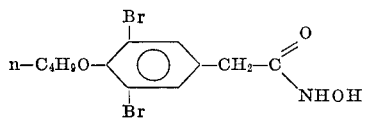

(1) 147 g. of 3,5-dibromo-4-hydroxyacetophenone, 35 g. of KOH in 35 cc. of water, 75 g. of butyl bromide and 400 ml. ethanol are mixed together and refluxed for 2 hours. The reaction mixture is cooled, diluted with water, then extracted with ether. The ether phase is washed with a 10% sodium hydroxide solution and with water, then dried, the ether is evaporated and the product is distilled under reduced pressure. 63 g. of 3,5-dibromo-4-butoxyacteophenone are obtained (176–177° C./2 mm. Hg).

(2) 63 g. of 3,5-dibromo-4-butoxyacetophenone, 10 g. of sulfur and 26 g. of morpholine are mixed together and refluxed for 14 hours. The resulting solution is poured into water and stirred until crystallization of the sulfurated complex occurs. The latter is filtered, washed with water and dried.

(3) 56 g. of potassium hydroxide are dissolved in 400 cc. of ethanol. The above sulfurated complex is added and the mixture is refluxed over night. Maximum alcohol is then distilled off and one dilutes with water. The resulting solution is acidified with HCl, then extracted with ether. The ether phase is washed with water, then extracted with a 10% sodium carbonate solution. The carbonated solution is acidified with 50% hydrochloric acid. The resulting precipitate is filtered and dried. 30 g. of 3,5-dibromo-4-butoxyphenylacetic acid are obtained.

(4) 15 g. of 3,5-dibromo-4-butoxyphenylacetic acid, 32 g. of ethanol and 8 cc. of sulfuric acid are refluxed for 5 hours. The mixture is diluted with water, then extracted with ether. The ether phase is washed with water, carbonate, and water successively, then is dried and evaporated. The ester is distilled under reduced pressure. Thus 10 g. of ethyl 3,5-dibromo-4-butoxyphenylacetate are obtained (202° C./3.5 mm. Hg).

(5) 7 g. hydroxylamine hydrochloride are dissolved in 100 cc. of methanol. A solution of 5 g. of sodium in 150 cc. of methanol is added and the salt formed is filtered. 37.8 g. of 3,5-dibromo-4-butoxyphenylacetate are added and the mixture is refluxed for one hour, cooled and acidified with 20% hydrochloric acid. 24 g. of N-hydroxy-3,5-dibromo-4-butoxyphenylacetamide are thus obtained (melting point: 127–131° C.).

Exactly by the same way, the following N-hydroxyamides were prepared:

N-hydroxy-3,5-dibromo-4-isobutyloxyphenylacetamide
N-hydroxy-3,5-dibromo-4-isoamyloxyphenylacetamide Starting substituted acetophenone can also be obtained from a halogenophenol which is condensed with an alkyl halide, such as alkyl bromide, so as to give alkyloxybenzene which is treated with acetic anhydride in the presence of an acid catalyst of Lewis (for example a metal chloride, polyphosphoric acid or boron fluoride) in order to obtain substituted acetophenone.

This procedure is more particularly set forth in detail in the following example for the preparation of N-hydroxy-3-chloro-4-butoxyphenylacetamide.

EXAMPLE 2

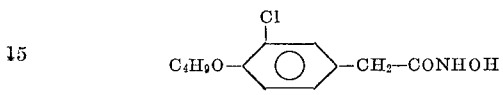

(1) 560 g. of o-chlorophenol in 1100 ml. of ethanol, 305 g. of potassium hydroxide in 220 ml. of water and 655 g. of butyl bromide are mixed and refluxed for 2 hours, then the alcohol is distilled off. The residue is treated with water, then extracted with ether, washed with carbonate and water, then the solution is dried. The product is distilled and 722 g. of o-chlorobutoxybenzene are obtained with a yield of 89.5% (92° C./2 mm. Hg).

(2) 200 g. of o-chlorobutoxybenzene are treated with 152 g. of acetic anhydride and 6 g. of zinc chloride. The mixture is refluxed for 2 hours with stirring. One dilutes with water, then extracts with ether. The ether solution is washed with water, carbonate and water successively, then dried on magnesium sulfate. The product is distilled under vacuum (156° C./2 mm. Hg) and 65 g. of 3-chloro-4-butoxyacetophenone are isolated.

(3) 86 g. of 3-chloro-4-butoxyacteophenone, 18 g. of sulfur and 50 g. of morpholine are mixed and refluxed over night. 97 g. of potassium hydroxide and 760 ml. of ethanol are added and the mixture is again refluxed over night. The acid is isolated by usual way and 75 g. of 3-chloro-4-butoxyphenylacetic acid are obtained.

(4) With 75 g. of 3-chloro-4-butoxyphenylacetic acid, 110 g. of ethanol and 8 cc. of concentrated sulfuric acid are mixed. The solution is refluxed for 2 hours and then 49 g. of 3-chloro-4-butoxyphenylacetate ester (160° C./2 mm. Hg) are distilled off under vacuum.

(5) 12.5 g. of hydroxylamine hydrochloride in 180 ml. of methanol are mixed with a solution of 9 g. of sodium in 270 ml. of methanol. To the filtered solution, 49 g. of ethyl 3-chloro-4-butoxyphenylacetate ester are added dropwise with stirring. The latter is proceeded for 1 hour and then the mixture is poured on ice and acidification with 20% HCl is provided. Finally, after treatment with petroleum ether, 29 g. of N-hydroxy-3-chloro-4-butoxyphenylacetamide are separated (melting point: 128–131°).

By the same procedure as in Example 2, the N-hydroxyamides of Examples 3 and 4 were prepared, only the last reaction between ester and hydroxylamine being described.

EXAMPLE 3

N-hydroxy-4-allyloxy-3-clhorophenylacetamide 70 g. of hydroxylamine hydrochloride are dissolved in 1000 cc. of methanol. A solution of 50 g. of sodium in 1500 cc. of methanol is added and the salt formed is filtered. 254.5 g. of ethyl 3-chloro-4-allyloxyphenylacetate are added and the mixture is stirred over night at room temperature. The mixture is poured onto ice water and acidified with 20% hydrochloric acid. 144.9 g. of N-hydroxy - 4 - allyloxy - 3 - chlorophenylacetamide (yield: 60%) are thus obtained. The product is recrystallized from methanol (melting point: 129–131° C.). A wine-red coloration is obtained with ferric chloride.

*Analysis.*—Calculated (percent): C, 54.67; H, 5.00; N, 5.80. Found (percent): C, 54.50; H, 4.98; N, 5.87.

EXAMPLE 4

N-hydroxy-3-fluoro-4-butoxyphenylacetamide 4.5 g. of hydroxylamine hydrochloride are mixed with a solution of 3.2 g. of sodium in 95 ml. of methanol. To the filtered solution, 16 g. of ethyl 3-fluoro-4-butoxyphenyl-acetate are added and the mixture is refluxed for 30 minutes. One volume of water is added and, after acidification with 30% HCl, N-hydroxy-3-fluoro-4-butoxyphenylacetamide is filtered and dried (yield: 78%; 150°–152° C.).

*Analysis.*—Calculated (percent): C, 59.75; H, 6.83; N, 5.81. Found (percent): C, 59.94; H, 6.49; N, 5.77.

By using same procedures as above, the following compounds were prepared.

N-hydroxy-3-chloro-4-propyloxyphenylacetamide
N-hydroxy-3-chloro-4-isoamyloxyphenylacetamide
M.P.: 149–151° C.)
N-hydroxy-3-chloro-4-isobutyloxyphenylacetamide (M.P.: 138–140° C.)
N-hydroxy-3-bromo-4-butyloxyphenylacetamide (M.P.: 147–148° C.)

EXAMPLE 5

N-hydroxy-3-chloro-4-crotyloxyphenylacetamide

To a solution of 7 g. of hydroxylamine hydrochloride in 100 cc. of methanol, a solution of 5 g. of sodium in 150 cc. of methanol is added. The salt formed is filtered and 25.4 g. (0.1 mol) of methyl 3-chloro-4-crotyloxyphenylacetate are added. The mixture is stirred overnight at room temperature and acidified with diluted hydrochloric acid. The precipitate obtained is filtered and recrystallized from aqueous acetone. Melting point: 138–140° C. (decomp.). Yield: 76%.

*Analysis.*—Calculated (percent): C, 56.37; H, 5.52; N, 5.48. Found (percent): C, 56.24; H, 5.48; N, 5.43.

By the same way, following N-hydroxyamides were prepared.

N-hydroxy-3-chloro-4-propargyloxyphenylacetamide (M.P.: 168–170° C.)

Calculated (percent): C, 55.12; H, 4.20; N, 5.84. Found (percent): C, 55.31; H, 4.21; N, 5.91.

N-hydroxy-3-chloro-4-methallyloxyphenylacetamide (M.P.: 137–140° C.)

Calculated (percent): C, 56.37; H, 5.52; N, 5.48. Found (percent): C, 56.12; H, 5.56; N, 5.40.

EXAMPLE 6

N-hydroxy-3-fluoro-4-propargyloxyphenylacetamide

To a solution of 7 g. of hydroxylamine hydrochloride in 100 cc. of methanol, a solution of 5 g. of sodium in 150 cc. of methanol is added. To the filtered solution, 22.4 g. (0.1 mol) of methyl 3-fluoro-4-propargyloxyphenylacetate are added. The mixture is stirred overnight at room temperature and acidified with diluted hydrochloric acid. The precipitate obtained is filtered and recrystallized from aqueous acetone. Yield: 74% (16.5 g.). M.P.: 145–146° C.

*Analysis.*—Calculated (percent): C, 59.19; H, 4.52; N, 6.20. Found (percent): C, 59.31; H, 4.50; N, 6.12.

By the same way, following N-hydroxyamides were prepared.

N-hydroxy-3-fluoro-4-allyloxyphenylacetamide (M.P.: 141–143° C.)

Calculated (percent): C, 58.66; H, 5.37; N, 6.22. Found (percent): C, 58.69; H, 5.25; N, 6.30.

N-hydroxy-3-fluoro-4-crotyloxyphenylacetamide (M.P.: 132–133° C.)

Calculated (percent): C, 60.24; H, 5.90; N, 5.85. Found (percent): C, 60.25; H, 5.78; N, 5.86.

N-hydroxy-3-fluoro-4-methallyloxyphenylacetamide (M.P.: 135.5–136.5° C.)

Calculated (percent): C, 60.24; H, 5.90; N, 5.85. Found (percent): C, 59.97; H, 5.80; N, 5.93.

N-hydroxy-3-fluoro-4-propyloxyphenylacetamide (M.P.: 151–152° C.)

Calculated (percent): C, 58.14; H, 6.21; N, 6.16. Found (percent): C, 57.97; H, 6.29; N, 6.21.

EXAMPLE 7

N-hydroxy-3-bromo-4-allyloxy-5-methylphenylacetamide

To a solution of 3.3 g. of hydroxylamine hydrochloride in 50 cc. of methanol, a solution of 2.3 g. of sodium in 70 cc. of methanol is added. To the filtered solution, 12 g. (0.046 mol) of methyl 3-bromo-4-allyloxy-5-methylphenylacetate are added and the mixture is stirred overnight at room temperature, then acidificed with diluted hydrochloric acid and the precipitate obtained is filtered and recrystallized from aqueous methanol. Yield: 87% (10.5 g.); M.P.: 150.5–151.5° C.

*Analysis.*—Calculated (percent): C, 48.01; H, 4.70; N, 4.67. Found (percent): C, 47.86; H, 4.65; N, 4.51.

In the same manner, following N-hydroxyamides were prepared.

N-hydroxy-3-bromo-4-propargyloxy-5-methylphenylacetamide (M.P.: 154–156° C.)

Calculated (percent): C, 48.34; H, 4.06; N, 4.70. Found (percent): C, 48.52; H, 4.05; N, 4.54.

N-hydroxy-3-bromo-4-methallyloxy-5-methylphenylacetamide (M.P.: 150–152° C.)

Calculated (percent): C, 49.70; H, 5.13; N, 4.46. Found (percent): C, 49.60; H, 5.06; N, 4.45.

N-hydroxy-3-chloro-4-proparagyloxy-5-methylphenylacetamide (M.P.: 154–155° C.)

Calculated (percent): C, 56.82; H, 4.76; N, 5.52. Found (percent): C, 56.68; H, 4.66; N, 5.38.

N-hydroxy-3-chloro-4-allyloxy-5-methylphenylacetamide (M.P.: 151–152° C.)

Calculated (percent): C, 56.37; H, 5.52; N, 5.47. Found (percent): C, 56.13; H, 5.39; N, 5.10.

N-hydroxy-3-chloro-4-propyloxy-5-methylphenylacetamide (M.P.: 158–160° C.)

Calculated (percent): C, 55.93; H, 6.26; N, 5.43. Found (percent): C, 55.72; H, 6.17; N, 5.32.

N-hydroxy-3,5-dichloro-4-allyloxyphenylacetamide (M.P.: 145–147° C.)

Calculated (percent): C, 47.85; H, 4.02; N, 5.07. Found (percent): C, 47.71; H, 3.98; N, 5.12.

N-hydroxy-3,5-dichloro-4-propyloxyphenylacetamide (M.P.: 149–150° C.)

Calculated (percent): C, 47.50; H, 4.71; N, 5.04. Found (percent): C, 47.44; H, 4.75; N, 5.01.

N-hydroxy-3,5-dibromo-4-propyloxyphenylacetamide (M.P. 145–146° C.)

Calculated (percent): C, 35.96; H, 3.54; N, 3.81. Found (percent): C, 36.08; H, 3.68; N, 3.91.

N-hydroxy-3,5-dibromo-4-isoamyloxyphenylacetamide (M.P.: 154–156° C.)

Calculated (percent): C, 39.49; H, 4.30; N, 3.54. Found (percent): C, 39.58; H, 4.28; N, 3.61.

EXAMPLE 8

N-hydroxy-3-chloro-4-cyclohexenyloxyphenylacetamide

To a solution of 5 g. of sodium in 150 cc. of methanol, a solution of 7 g. of hydroxylamine hydrochloride in 100 cc. of methanol is added. The salt is filtered and 27.9 g. of methyl 3-chloro-4-cyclohexenyloxyphenylacetate are added. The mixture is stirred overnight at room temperature, then acidified with 20% HCl. The oily precipitate is extracted with ether, dried and evaporated. The residue is recrystallized from aqueous methanol. Yield: 52% (14.5 g.). M.P.: 133–135° C. (decomp.).

Hereinafter examples of N-hydroxyamides with $R_4$ and $R_5$ other than H in Formula I are given.

EXAMPLE 9

N-hydroxy α-(4-butoxyphenyl)propionamide

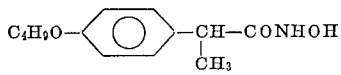

(1) A solution containing 0.28 mol of sodium amide in 300 cc. of liquid ammonia is prepared. Ammonia is slowly evaporated on water-bath and replaced by 200 cc. of anhydrous ether. The mixture is refluxed for about 15 minutes. 47.20 g. of p-butoxybenzyl cyanide (0.25 mol) are then added dropwise. The reaction mixture is refluxed for 45 minutes and 31 g. of dimethyl sulfate (0.25 mol) are then added with eventual cooling. When the addition is complete, the solution is refluxed for 3 hours and then allowed to stand overnight. It is to be noted that advantages are gained if the whole operation is carried out in an inert atmosphere.

Maximum ether is then distilled off on water-bath and the residue is dissolved in water. The solution is extracted with ether, the ether phase is dried and evaporated and the residue is distilled under vacuum. 41 g. of α-(p-butoxyphenyl) propionitrile are obtained with a yield of Boiling point: 158–160° C./2.3 mm.; $n_D^{20}=1.5035$.

(2) 20.3 g. of α-(p-butoxyphenyl) propionitrile (0.01 mol), 29 cc. of ethanol and 11 cc. of concentrated sulfuric acid are mixed. The mixture is refluxed for 10 hours, then one dilutes with water and extracts with ether. The ether phase is washed with 10% carbonate and water, dried and evaporated. Distillation under reduced vacuum gives 19.5 g. of ethyl α-(p-butoxyphenyl propionate. Yield: 78%. Boiling point: 148°–150°/3 mm.; $n_D^{25}=1.4933$.

(3) 3.2 g. of hydroxylamine hydrochloride are dissolved in 50 cc. of methanol and the salt formed is filtered. 12.5 g. (0.05 mol) of ethyl α-p-butoxyphenylpropionate are added and one refluxes for 1 hour. The mixture is cooled and acidified with 10% hydrochloric acid. The solid obtained is stirred several hours with petroleum ether. 7.6 g. of N-hydroxy α(p-butoxyphenyl) propionamide are thus obtained. Yield: 61%. Melting point: 109–111°. Wine-red coloration with FeCl₃.

EXAMPLE 10

N-hydroxy α-(p-butoxyphenyl) butyramide (1) The procedure is the same as in step 1 of Example 9. 0.28 mol of sodium amide in 300 cc. of liquid ammonia, 47.20 g. of p-butoxybenzyl cyanide and 38 g. of diethyl sulfate are used and 51 g. of α-(p-butoxyphenyl) butyronitrile are obtained. Yield: 93%; boiling point: 140–141°/1.5 mm.; $n_D^{20}=1.5006$.

(2) The procedure used is identical to that of step 2 of Example 9. 22 g. of α-(p-butoxyphenyl) butyronitrile (0.1 mol), 29 cc. of ethanol and 11 cc. of sulfuric acid are used. Distillation under reduced pressure gives 19.3 g. of ethyl α-p-butoxyphenyl) butyrate. Yield: 75%; boiling point 164–165°/4.5 mm.; $n_D^{20}=1.4922$.

(3) The procedure used is identical to that of step 3 of Example 9. 13.5 g. (0.05 mole) of ethyl α-(p-butoxyphenyl) butyrate are used and the solid obtained after acidification is filtered and stirred for several hours with petroleum ether. 6.9 g. of N-hydroxy α-(p-butoxyphenyl) butyramide are obtained. Yield: 51%; melting point: 101.5° C. Wine-red coloration with FeCl₃.

EXAMPLE 11

N-hydroxy-4-butoxymandelamide

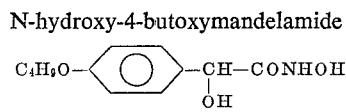

A solution of 5 g. of sodium in 150 ml. of methanol is mixed with a solution of 7 g. of hydroxylamine hydrochloride in 100 ml. of methanol. Then, the mixture is filtered and 0.1 mol of methyl p-butoxymandelate is added. The mixture is refluxed for 30 minutes and 1 volume of water is added, then one acidifies with 30% HCl. The hydroxamic acid thus precipitated is filtered and dried. (Melting: 158–159° C.; yield: 69%).

EXAMPLE 12

N-hydroxy α-(3-chloro-4-butoxyphenyl)propionamide

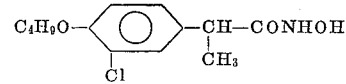

1.4 g. of hydroxylamine hydrochloride are dissolved in 20 cc. of methanol. A solution of 1 g. of sodium in 30 cc. of methanol is added and the salt formed is filtered. To the resulting solution, 5 g. of ethyl α-(3-chloro-4-butoxyphenyl) propionacetate are added. The mixture is stirred overnight at room temperature and acidified with 20% HCl. The solid so obtained is stirred for several hours with petroleum ether, filtered and dried. 2.3 g. of product are obtained with a M.P. of 95–96° C. (decomp.).

*Analysis.*—Calculated (percent): C, 57,45; H, 6.68; N, 5.15. Found (percent): C, 57.33; H, 6.65; N, 5.20.

EXAMPLE 13

N-hydroxy α-(3-chloro-4-allyloxyphenyl) propionamide

To a solution of 7 g. of hydroxylamine hydrochloride in 100 cc. of methanol, a solution of 5 g. of sodium in 150 cc. of methanol is added. To the filtered solution, 25.5 g. of methyl α-(3-chloro-4-allyloxyphenyl) propionacetate are added. The mixture is stirred overnight at room temperature and acidified with diluted hydrochloric acid. The precipitate so obtained is filtered and recrystallized from a mixture of acetone-cyclohexane. Yield: 74% (19.1 g.). M.P.: 110–113° C.

*Analysis.*—Calculated (percent): C, 56.37; H, 5.52; N, 5.48. Found (percent): C, 56.22; H, 5.38; N, 5.42.

Following N-hydroxyamides with substituents in $R_4$ or $R_5$ positions were also prepared.

N-hydroxy α-(4-butoxy-3-chlorophenyl) butyramide
N-hydroxy α-(4-butoxyphenyl) amylamide
N-hydroxy α-(4-butoxyphenyl)-α'-methylpropionamide
N-hydroxy α-(4-butoxyphenyl)-α'-ethylbutyramide
N-hydroxy α-(4-butoxyphenyl)-α'-diethylaminoethylpropionamide
N-hydroxy α-(p-butoxyphenyl) hexylamide.

Examples of amides of substituted arylacetic acids according to Formula I are given hereinafter.

EXAMPLE 14

3-chloro-4-butoxyphenylacetamide

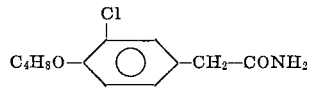

To an ammonia-saturated solution of 0.3 g. of sodium in 300 ml. of methanol, a solution of 0.15 mol of ethyl 3-chloro-4-butoxyphenylacetate ester is added. An ammonia stream is still passed through the reaction medium for 2 to 3 hours. After one night, water is added to precipitate 3 - chloro - 4 - butoxyphenylacetamide (M.P.: 124–125° C.).

EXAMPLE 15

3-chloro-4-propyloxyphenylacetamide

To an ammonia-saturated solution of 0.2 g. of sodium in 240 cc. of methanol, 24.4 g. (0.1 mol) of methyl 3-chloro-4-propyloxyphenylacetate in 50 cc. of methanol are added. The mixture is allowed to stand for 48 hours at room temperature and most of solvent is evaporated. The residue is filtered and recrystallized from aqueous methanol. Yield: 82% (18.8 g.). M.P.: 133–134° C.

*Analysis.*—Calculated (percent): C, 58.02; H, 6.20; N, 6.15. Found (percent): C, 57.91; H, 6.09; N, 6.17.

By using same process, the following amides were prepared.

3-chloro-4-isobutyloxyphenylacetamide (M.P.: 122–123° C.)
3-chloro-4-isoamyloxyphenylacetamide (M.P.: 115–117° C.)
3-chloro-5-methyl-4-propyloxyphenylacetamide (M.P.: 102–104° C.)
4-butoxy-3.5-dibromophenylacetamide (M.P.: 115–116° C.)
4-propyloxy-3.5-dibromophenylacetamide (M.P.: 130–131° C.)
4-isoamyloxy-3.5-dibromophenylacetamide (M.P.: 110° C.)

EXAMPLE 16

3-chloro-4-propargyloxyphenylacetamide

To an ammonia-saturated solution of 200 cc. of anhydrous methanol, 23.8 g. of methyl 3-chloro-4-propargyloxyphenylacetate and 0.1 g. of sodium are added. The mixture is allowed to stand for 48 hours at room temperature. Most of solvent is evaporated under vacuum and the white solid is filtered. Recrystallization is made from aqueous methanol and one obtains 18.7 g. of amide. Yield: 81%; M.P.: 154–156.5° C.

*Analysis.*—Calculated (percent): C, 59.07; H, 4.50; N, 6.26. Found (percent): C, 59.06; H, 4.55; N, 6.27.

EXAMPLE 17

3-fluoro-4-propargyloxyphenylacetamide 18.9 g. of 3-fluoro-4-propargyloxyphenylacetonitrile are mixed with 100 cc. of 35% HCl. The mixture is heated to 40° C. with vigorous stirring for 1.5 hours to 2 hours. 100 cc. of distilled water are then added at temperature of 15–20° C., then the mixture is cooled on ice bath for 30 minutes and the solid is filtered. Recrystallization is made from aqueous ethanol. 15.9 g. of amide are obtained (Yield: 77%). M.P.: 133–134° C.

*Analysis.*—Calculated (percent): C, 63.76; H, 4.86; N, 6.76. Found (percent): C, 63.78; H, 4.95; N, 6.67.

EXAMPLE 18

3-bromo-4-methallyloxy-5-methylphenylacetamide 29.9 g. of 3-bromo-4-metallyloxy-5-methylphenylacetic acid in 100 cc. of anhydrous benzene and 24 g. of thionylchloride are heated in water-bath at 70–80° C. with stirring for 2 hours. Benzene is evaporated under vacuum, 50 cc. of benzene are again added and the mixture is evaporated under vacuum. The crude acid chloride is dropwise added with stirring to 100 cc. of concentrated ammonia, in ice-bath. The crude product is filtered, washed with water and recrystallized from aqueous ethanol. 21.3 g. of amide are obtained with a yield of 71%. M.P.: 113–114° C.

*Analysis.*—Calculated (percent): C, 52.36; H, 5.41; N, 4.70. Found (percent): C, 52.25; H, 5.37; N, 4.71.

By using same processes, following amides were prepared:

3-chloro-4-allyloxyphenylacetamide (M.P.: 144–146° C.)
3-chloro-4-crotyloxyphenylacetamide (M.P.: 126.5–127.5° C.)
3-chloro-4-metallyloxylphenylacetamide (M.P.: 104.5–105.5° C.)

Amides having one or two substituents in position $R_4$ and $R_5$ are now described.

EXAMPLE 19

(4-butoxyphenyl) propionamide

0.1 mol (20.3 g.) of α-(4-butoxyphenyl) propionitrile, 40 cc. of hydrogen peroxide, 52 cc. of ethanol and 4 cc. of 6 N NaOH are mixed. The temperature is maintained at 40–50° C. for 4 hours. One neutralises with 5% $H_2SO_4$ and the solid obtained is filtered. The latter is recrystallized in a methanol-water mixture, then in benzene. 18 g. of α-(4-butoxyphenyl) propionamide are obtained with a yield of 81%; melting point: 105–106°.

*Analysis.*—Calculated (percent): C, 70.56; H, 8.65; N, 6.33. Found (percent): C, 70.54; H, 8.65; N, 6.27.

EXAMPLE 20

α-(4-butoxyphenyl) butyramide

The procedure used is identical to that of preceding example. From 0.1 mole (22 g.) of α-(4-butoxyphenyl) butyronitrile17.4 g. of α-(4-butoxyphenyl) butyramide are obtained. Yield: 74%. After recrystallization from benzene, the melting point is 107–108° C.

*Analysis.*—Calculated (percent): C, 71.46; H, 8.99; N, 5.95. Found (percent): C, 70.88; H, 8.78; N, 6.01.

By same process, following amides can be prepared:

α-(4-butoxyphenyl) amylamide (M.P.: 85.5–86.5° C.)
α-(4-butoxyphenyl) hexylamide (M.P. 95.5–96° C.)

EXAMPLE 21

α-(3-chloro-4-butoxyphenyl) propionamide 120 cc. of anhydrous methanol and 0.1 g. of sodium are saturated at 0° C. with a stream of ammonia. Then, 12.2 g. (0.05 mol) of ethyl α-(3-chloro-4-butoxyphenyl) propionate in 50 cc. of methanol are added. The solution is allowed to stand for 24 to 48 hours at room temperature. Methanol is evaporated under vacuum and residue is recrystallized from benzene-hexane. M.P.: 92–93° C.

*Analysis.*—Calculated (percent): C, 61.05; H, 7.09; N, 5.48. Found (percent): C, 61.15; H, 7.15; N, 5.62.

Other amides with substituents in $R_4$ and $R_5$ which were prepared are the following:

α-(cyclohexyl)-α'-(p-butoxyphenyl) acetamide (M.P.: 173–174° C.)

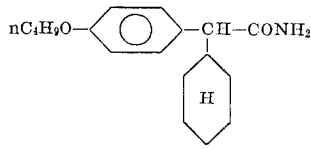

α-(N-dimethylaminoethyl)-α'-(p-butoxyphenyl) acetamide (M.P.: 96–97° C.)

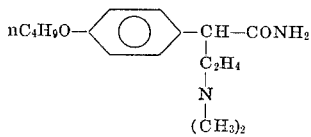

α-methyl-α'-(p-butoxyphenyl) propionamide (M.P.: 157.5–158° C.)

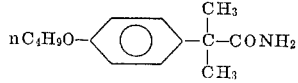

α-ethyl-α'-(p-butoxyphenyl) butyramide (M.P.: 69-70° C.)

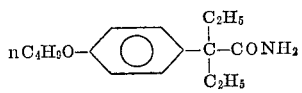

α-(3-chloro-4-butoxyphenyl) butyramide
α-(4-butoxyphenyl)-α'-diethylaminoethyl propionamide Hereinafter are described amides of Formula I wherein a substituent is provided on the nitrogen atom.

EXAMPLE 22

N-diethylaminoethyl-3-chloro-4-butoxyphenylacetamide

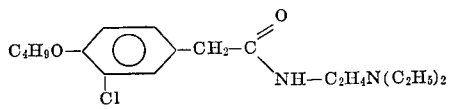

To 13.2 g. of N-diethylaminoethylamine (0.15 mol) in 150 cc. of 1,2-dichloroethane, 0.15 g. of 3-chloro-4-butoxyphenylacetic chloride and 33 cc. of sodium hydroxide (20° C.) are added at the same time but separately at −10° C. with stirring. The mixture is allowed to stand at this temperature for 1 hour, then brought again to room temperature. The mixture is diluted with water and the organic phase is separated and successively washed with 5% HCl, 5% sodium bicarbonate and water. The liquid is dried on magnesium sulfate and the residue is rectified under vacuum B.P.: 205–210° C./3 mm.

EXAMPLE 23

N-morpholino-3-chloro-4-propargyloxyphenylacetamide

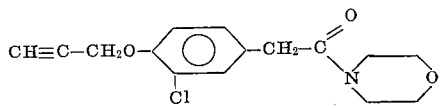

To 17.2 g. of 3-chloro-4-propargyloxyphenylacetic acid in 20 cc. of anhydrous benzene, 7.85 g. of morpholine in 20 cc. of benzene are added dropwise with stirring. The stirring is continued for 3 hours at room temperature, then the solid obtained is filtered and recrystallized from benzene, then from methanol. Yield: 65.1% (17.2 g. M.P.: 125–126.5° C.

*Analysis.*—Calculated (percent): C, 61.33; H, 5.49; N, 4.77. Found (percent): C, 61.27; H, 5.60; N, 4.72.

By the same process, following amides were prepared:

N-dipropyl-3-chloro-4-propargyloxyphenylacetamide

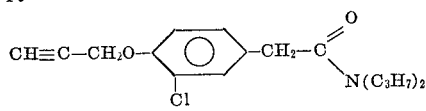

M.P.: 172–173° C./0.01 mm.
Yield: 70.5%

N-piperidino-3-chloro-4-propargyloxyphenylacetamide

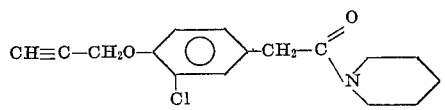

M.P.: 149–151° C.
Yield: 74.2%

EXAMPLE 24

N-butyl-3-chloro-4-propargyloxyphenylacetamide

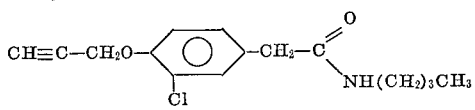

To 30 g. of 3-chloro-4-propargyloxyphenylacetic chloride in 50 cc. of anhydrous benzene, 9.75 g. of butylamine in 50 cc. of anhydrous benzene are dropwise added with stirring. The mixture is stirred overnight at room temperature and the solid obtained is filtered and recrystallized from aqueous methanol. Yield: 65.2%. M.P.: 93–94.5° C.

By the same process, following amides were obtained:

N-(2-hydroxyethyl)-3-chloro-4-propargyloxyphenylacetamide.

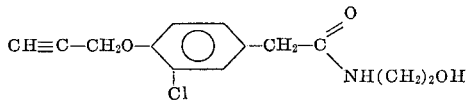

M.P.: 119–122° C.
Yield: 70.2%

N-isopropyl-3-chloro-4-propargyloxyphenylacetamide

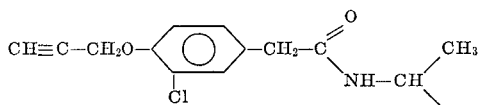

M.P.: 125.5–127° C.
Yield: 68.2%

N-(2-phenylethyl)-3-chloro-4-propargyloxyphenylacetamide

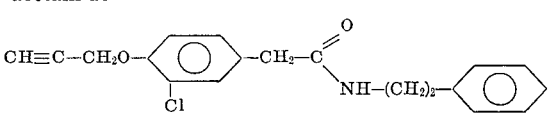

M.P.: 107–108.5° C.
Yield: 58.2%

N-(dimethylaminoethyl)-3-chloro-4-propargyloxyphenylacetamide

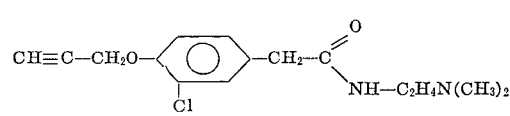

M.P. of hydrochloride: 149.5–152° C.
Yield: 63.2%

This invention relates also to salts of N-hydroxyamides of Formula I. These are salts of alkali and alkaline-earth metals and ammonium salts.

As well as amides and N-hydroxyamides hereinbefore named, the salts have also numerous applications in pharmaceutical field due to their anti-inflammatory, analgesic, antipyretic and antispasmodic activity.

Three general processes for preparing said salts can be used:

(A) Direct synthesis from corresponding arylacetate esters

Such an ester is reacted with hydroxylamine in the presence of a strong base of alkali metal, such alkali hydroxides or alkoxides (for example sodium hydroxide, potassium hydroxide, sodium methoxide or potassium methoxide), to obtain sodium or potassium salt of hydroxamic acid.

(B) Neutralization of N-hydroxyamides with a strong base

N-hydroxyamides are neutralized with alkali hydroxides or alkoxides in a suitable solvent to obtain alkali hydroxamates.

N-hydroxyamides are neutralized with ammonia solution or with a gaseous ammonia stream in a suitable solvent to obtain ammonium hydroxamates.

(C) Exchange and precipitation in a solvent to obtain alkaline-earth salts

Alkali hydroxamates or ammonium hydroxamates soluble in the solvent are treated with a strong base of the alkaline-earth metal soluble in the solvent, for example with magnesium or calcium chloride and the alkaline-earth salt is precipitated.

EXAMPLE 25

Preparation of salts by direct synthesis (a) In the presence of an alkali metal hydroxide.—A solution of 700 g. of hydroxylamine hydrochloride in 5 l. of methanol is prepared and a solution of 1000 g. of potassium hydroxide in 3 l. of methanol is added with stirring. After cooling, the precipitate of potassium chloride which is formed is filtered and to the filtrate, are added with stirring 1350 g. of ethyl 4-butoxy-3-chlorophenylacethydroxamate. After standing for 4 hours, the solution is concentrated under reduced pressure until a volume of 2 liters. After addition of 5 l. of ether, the solution is allowed to stand for 2 hours and crystals of potassium salt are centrifuged out. Thus potassium 4-butoxy-3-chlorophenylacethydroxamate is obtained. Yield: 750 g. Most part of the salt dissolved in the mother liquors is recovered as acid.

(b) In the presence of an alkali alkoxide.—300 g. of sodium are dissolved in 5 l. of methanol and separately 420 g. of hydroxylamine hydrochloride are dissolved in 3 l. of methanol. After mixing said two solutions, the precipitate of sodium chloride formed is filtered. To the filtrate, 1500 g. of ethyl 4-butoxy-3-chlorophenylacethydroxamate are added and evaporation is carried out under reduced pressure until a volume of 4 liters. Acetone is added until precipitation starts. After one night in a cooler, the sodium salt is centrifuged out, washed with a mixture of methanol/acetone (1/3) and dried. Sodium 4-butoxy-3-chlorophenylacethydroxamate is thus obtained. Yield: 1100 g.

EXAMPLE 26

Neutralization of hydroxamic acids with a strong base (a) Neutralization with alkali hydroxide.—To a solution of 2600 g. of 4-butoxy-3-chlorophenylacethydroxamic acid in 5 l. of methanol, stirred at 35° C., 1050 ml. of a normal methanolic solution of potassium hydroxide are added. After cooling, precipitation is completed by addition of acetone. Potassium salt flakes are centrifuged out, washed with a mixture of methanol/acetone (1/3) and dried. Potassium 4-butoxy-3-chlorophenylacethydroximate is thus obtained. Yield: 175 g.

(b) Neutralization with ammonia.—A dry gaseous ammonia stream is passed through a solution of 20 g. of 4-butoxy-3-chlorophenylacethydroxamic acid in 500 ml. of methanol. White crystals of ammonium salt of said acid are obtained, which are centrifuged out, washed with methanol and dried under vacuum at room temperature.

EXAMPLE 27

(a) Preparation of magnesium salt.—To a solution of 260 g. of 4-butoxy-3-chlorophenylacethydroxamic acid in 5 l. of methanol, stirred at 35° C., 900 ml. of a normal solution of potassium hydroxide in methanol are added and then 950 ml. of a solution containing 101.7 g. of magnesium chloride (hexahydrate) per liter of methanol. A powdered white precipitate of magnesium 4-butoxy-3-chlorophenylacethydroxamate forms immediately. After one hour, the precipitate is centrifuged out and washed many times with methanol. Yield: 230 g.

(b) Preparation of calcium salt.—260 g. of 4-butoxy-3-chlorophenylacethydroxamic acid are introduced with vigorous stirring into 4 l. of methanol at 60° C. After dissolution is complete, 78 g. of calcium chloride (dihydrate) are added. One allows to cool down to 45° and a strong stream of ammonia is passed through with stirring for 1 hour. After cooling to room temperature, the precipitate is centrifuged out and washed with methanol, water and acetone successively. After air drying, 210 g. of calcium salt are obtained as a white powder.

None of said N-hydroxyamides, salts and amides according to the invention was described until now in the literature. They are intended to be used either alone or mixed with other substances in the preparation of pharmaceutical products, as anti-inflammatory, analgesic, antipyretic and antispasmodic agents.

The properties of the new compounds according to the invention are set forth hereinafter.

Table 1

$LD_{50}$ and antispasmodic action

The results given for the antispasmodic action relate to mgr. per ml. necessary to obtain a total inhibition of spasms on guinea pig ileum, said spasms being caused by histamine, acetylcholine and $BaCl_2$ in accordance with conventional techniques.

$LD_{50}$ values are given in mg./kg. of body weight on mice, the administration being made per os. For said antispasmodic activity, data are also given for several known compounds as controls.

COMPOUNDS WITH $R_6=H$ AND $R_7=OH$

| Compounds | | | | | $LD_{50}$, mg./kg. | Antispasmodic action | | |
|---|---|---|---|---|---|---|---|---|
| $R_1$ | $R_2$ | $R_3$ | $R_4$ | $R_5$ | | Hist. | AC | $BaCl_2$ |
| $C_4H_9$ | Cl | H | H | H | 2,210 | 1.75 | 14 | 7 |
| $C_4H_9$ | Br | H | H | H | 2,300 | 7 | 14 | 3.5 |
| $C_4H_9$ | F | H | H | H | 4,150 | 3.5 | 14 | 14 |
| $C_4H_9$ | H | H | $C_2H_5$ | H | ±4,000 | 7 | 14 | 14 |
| $C_4H_9$ | H | H | $C_3H_7$ | H | 4,000 | 7 | 7 | 7 |
| $C_4H_9$ | H | H | $C_4H_9$ | H | --------- | 14 | 14 | 7 |
| $IsoC_5H_{11}$ | Cl | H | H | H | >4,000 | 1.5 | 7 | 7 |
| $C_5H_9$ | Br | Br | H | H | --------- | 7 | 7 | 3.5 |
| $C_5H_7$ | Br | H | H | H | ±3,000 | 7 | 14 | 7 |
| $C_5H_{11}$ | Cl | H | H | H | 2,950 | 7 | 3.5 | 7 |
| $CH_2=CH—CH_2—$ | Cl | H | H | H | 2,080 | >14 | >14 | >14 |
| $C_3H_7$ | Cl | H | H | H | 2,030 | >14 | >14 | >14 |
| $IsoC_3H_7$ | Cl | H | H | H | 1,830 | >14 | >14 | >14 |
| $C_2H_5$ | Cl | H | H | H | 3,050 | 7 | >14 | >14 |
| $CH_3$ | Cl | H | H | H | 1,600 | >14 | >14 | >14 |
| $CH≡C—CH_2—$ | Cl | H | H | H | ±4,000 | >14 | >14 | >14 |
| $CH_2=C—CH_2—$<br>$\quad\vert$<br>$\quad CH_3$ | Cl | H | H | H | --------- | >14 | >14 | >14 |
| $CH_3—CH=CH—CH_2—$ | Cl | H | H | H | --------- | 14 | 14 | 14 |
| $CH_2=CH—CH_2—$ | Br | $CH_3$ | H | H | --------- | >14 | >14 | >14 |
| $CH_2=CH—CH_2—$ | F | H | H | H | --------- | >14 | >14 | >14 |
| $CH≡C—CH_2—$ | F | H | H | H | --------- | >14 | >14 | >14 |
| $CH≡C—CH_2—$ | Br | $CH_3$ | H | H | 3,200 | >14 | >14 | >14 |
| $CH≡C—CH_2—$ | Cl | $CH_3$ | H | H | ±3,500 | >14 | >14 | >14 |
| $CH_2=CH—CH_2—$ | Cl | $CH_3$ | H | H | --------- | >14 | >14 | >14 |
| $CH_3—CH=CH—CH_2—$ | F | H | H | H | --------- | >14 | >14 | >14 |
| $CH_2=C—CH_2—$<br>$\quad\vert$<br>$\quad CH_3$ | F | H | H | H | --------- | >14 | >14 | >14 |

COMPOUNDS WITH $R_6=R_7=H$

| Compounds | | | | | LD$_{50}$, mg./kg. | Antispasmodic action | | |
|---|---|---|---|---|---|---|---|---|
| $R_1$ | $R_2$ | $R_3$ | $R_4$ | $R_5$ | | Hist. | AC | BaCl$_2$ |
| IsoC$_5$H$_{11}$ | Cl | H | H | H | ---------- | 14 | 14 | 14 |
| C$_4$H$_9$ | Br | Br | H | H | 2,590 | 14 | 14 | 14 |
| C$_4$H$_9$ | Cl | H | H | H | 2,690 | 14 | 14 | 14 |
| CH≡C—CH$_2$— | Cl | H | H | H | 1,600 | >14 | >14 | >14 |
| C$_4$H$_9$ | H | H | CH$_3$ | H | 1,930 | >14 | >14 | >14 |
| C$_4$H$_9$ | H | H | C$_2$H$_5$ | H | 2,850 | -------- | 7 | 14 |
| C$_4$H$_9$ | H | H | C$_3$H$_7$ | H | 2,880 | 14 | 14 | -------- |
| C$_4$H$_9$ | H | H | C$_4$H$_9$ | H | >4,000 | 7 | 7 | 7 |
| C$_4$H$_9$ | H | H | C$_2$H$_5$ | C$_2$H$_5$ | 900 | 14 | 14 | 7 |
| Papaverine | | | | | | 20.5 | 14 | 7 |
| Atropine | | | | | | >1 | 0.01 | >1 |
| Cyclospasmol | | | | | | 10.5 | >14 | 6.5 |

As it may be seen from this Table 1, the antispasmodic activity of most compounds cited favorably compare with the activity of controls, being at least equal but generally higher than that of said controls.

Table 2

The following data relating to analgesic activity were obtained by the so-called Siegmund method which gives the results for ED$_{50}$ in mg./kg. [see E. Siegmund, R. Cadmier and G. Lu, Proc. Soc. exp. Biol., N.Y. 95: 729 (1957)].

Other data relating to analgesic activity were obtained by Randall and Selitto method which relates to the sensibility threshold to the pressure, expressed in g.

The values given in g. correspond to the maximum increase pain threshold 30 minutes after treatment, the values between [giving the dose administrated in mg./kg. [see L. O. Randall and J. J. Selitto—Arch. int. Pharmacodyn. III, 409 (1957)].

Data for known compounds are included for comparison.

These data show the compounds according to the invention have significant value as therapeutic agents.

COMPOUNDS WITH $R_6=H$ AND $R_7=OH$ AND $R_4=R_5=H$

| Compounds | | | Siegmund | Randall and Selitto |
|---|---|---|---|---|
| $R_1$ | $R_2$ | $R_3$ | | |
| C$_4$H$_9$ | Cl | H | 488 | 220 (400) |
| C$_4$H$_9$ | Br | H | >800 | 185 (400) |
| C$_4$H$_9$ | F | H | >800 | 430 (400) |
| C$_5$H$_{11}$ | Cl | H | >800 | -------- |
| CH$_2$=CH—CH$_2$— | Cl | H | 218 | 27 (400) |
| IsoC$_3$H$_7$ | Cl | H | -------- | 155 (400) |
| C$_2$H$_5$ | Cl | H | >400 | -------- |
| CH$_3$ | Cl | H | >400 | -------- |
| CH≡C—CH$_2$— | Cl | H | >400 | 69 (400) |
| CH$_2$=C—CH$_2$— | Cl | H | >400 | 112 (400) |
|     |<br>   CH$_3$ | | | | |
| CH$_3$—CH=CH—CH$_2$— | Cl | H | 94 | -------- |
| CH$_2$=CH—CH$_2$— | Br | CH$_3$ | ±400 | -------- |
| CH$_2$—CH=CH$_2$— | F | H | 89 | 135 (400) |
| CH≡C—CH$_3$— | F | H | ±230 | 55 (400) |
| CH≡C—CH$_2$— | Br | CH$_3$ | >400 | -------- |
| CH≡C—CH$_2$— | Cl | CH$_3$ | >400 | -------- |
| CH$_2$=CH—CH$_2$— | Cl | CH$_3$ | ±150 | -------- |
| CH$_3$—CH=CH—CH$_2$— | F | H | >400 | -------- |
| CH$_2$=CH—CH$_2$— | Cl | Cl | ±220 | -------- |
| CH≡C—CH$_2$— | Cl | H | >400 | 63 (400) |
| (with $R_6=R_7=H$) | | | | |
| Aspirine | | | 75 | 125 (100) |
| Phenylbutazone | | | 0 | (200) |
| Phenacetine | | | 94 | 53 (400) |

Table 3

This table relates to anti-inflammatory activity for compounds according to the invention.

The Benitz and Hall method relates to the weight reduction of carragheenin-induced abscess [see K. F. Benitz and L. M. Hall—Arch. int. Pharmacodyn. 144: 1–2, 185 (1963)]. Said data are given as a potency ratio with respect to phenylbutazone considered as having a potency of 1.

Data are also given as potency ratio with respect to phenylbutazone but having been obtained by the well-known cotton pellets-induced granuloma test.

Compounds with $R_6=H$ and $R_7=OH$

| $R_1$ | $R_2$ | $R_3$ | $R_4$ | $R_5$ | Abscess | Granuloma |
|---|---|---|---|---|---|---|
| C$_4$H$_9$ | Cl | H | H | H | 0.5 | 0.3 |
| C$_4$H$_9$ | Bl | H | H | H | 0.25 | 0.3 |
| C$_4$H$_9$ | F | H | H | H | 0.5 | 0.5 |
| C$_4$H$_9$ | H | H | CH$_3$ | H | 0.5 | -------- |
| C$_4$H$_9$ | H | H | C$_2$H$_5$ | H | 0.3 | 0.5 |
| C$_4$H$_9$ | H | H | C$_3$H$_7$ | H | 0.25 | 0.15 |
| C$_4$H$_9$ | H | H | C$_4$H$_9$ | H | 0.5 | 0.3 |
| IsoC$_5$H$_{11}$ | Cl | H | H | H | 0.25 | 0.3 |
| C$_4$H$_9$ | Cl | H | CH$_3$ | H | 0.25 | -------- |
| C$_5$H$_{11}$ | Cl | H | H | H | 0.25 | 0.3 |
| CH$_2$=CH—CH$_2$— | Cl | H | H | H | 0.5 | 0.3 |
| C$_3$H$_7$ | Cl | H | H | H | 0.5 | 0.3 |
| IsoC$_3$H$_7$ | Cl | H | H | H | 0.2 | 0.3 |
| C$_2$H$_5$ | Cl | H | H | H | 0.5 | 0.3 |
| CH≡C—CH$_2$— | Cl | H | H | H | 1 | 0.3 |
| CH$_2$—C—CH$_2$—<br>   |<br>  CH$_3$ | Cl | H | H | H | 0.5 | 0.3 |
| CH≡C—CH$_2$— | F | H | H | H | 0.5 | 0.5 |
| CH≡C—C—CH$_2$— | Br | CH$_3$ | H | H | 1 | -------- |
| CH$_2$=CH—CH$_2$— | Cl | H | CH$_3$ | H | 0.5 | -------- |
| CH$_2$=C—CH$_2$— | Cl | Cl | H | H | 0.5 | -------- |
| CH$_2$=C—CH$_2$—<br>   |<br>  CH$_3$ | Br | CH$_3$ | H | H | 0.2 | -------- |
| CH$_3$(CH$_2$)$_2$— | F | H | H | H | 0.5 | -------- |
| CH$_3$(CH$_2$)$_2$— | Cl | Cl | H | H | 1 | -------- |
| Compounds with $R_6=R_7=H$ | | | | | | |
| C$_4$H$_9$ | Br | Br | H | H | 0.5 | 0.3 |
| CH≡C—CH$_2$— | Cl | H | H | H | 2 | 0.3 |

As indicated by said tests, compounds of the invention show interesting activity.

With respect to the antipyretic activity as compared with that of aspirin, compounds of the invention also show an interesting activity. Thus if activity of aspirin is considered as being 1, N-hydroxy - 3 - chloro-4-butoxyphenylacetamide, N - hydroxy-3-bromo-4-butoxyphenylacetamide, N - hydroxy-3-fluoro-4-butoxyphenylacetamide have an activity of 1, 1 and 0.5 respectively. Activity of N-hydroxy-3-chloro-4-propargyloxyphenylacetamide is of 2 and that of N-hydroxy-3-chloro-4-metallyloxyphenylacetamide is of 1.5. Also, activity of 3-chloro-4-propargyloxyphenylacetamide is 2.

From the above results given by the tables, it appears that these novel amides and N-hydroxyamides of substituted arylacetic acids have an interesting combination of antipyretic, anti-inflammatory, antispasmodic and analgesic properties, with favorable activities not found simultaneously in the control products.

The new compounds of the invention can be administrated orally as pills with an enteric coating or as rectal suppositories.

The oral compositions may be in a tablet form containing 250 mg. of the active compound with carriers, such as silicium oxide, starch, polyethylene glycol, cellulose acetophthalate, diethylene glycol, propylene glycol and the like; coloring agents such as titanium dioxide may be included if desired.

The suppositories are dosed at 100, 250, 500 and 1000 mg. of active compound and are made by usual methods.

The new compounds can also be used as aerosol form. For example, 250 mg. of N-hydroxy-3-chloro-4-butoxyphenylacetamide, 75 g. of lecithin and 600 g. of isopropyl myristate are passed through a homogenizer-grinder and then placed in aerosol bomb in an atmosphere of Freon.

With respect to pills, the active compound can be mixed with corn starch, aerosil, polyvinyl pyrrolidone, sodium lauryl sulfate and silicone talc.

What is claimed is:

1. N-hydroxyamides of substituted arylacetic acids of the formula:

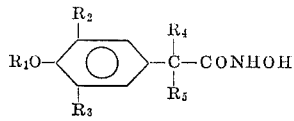

wherein $R_1$ represents linear or branched alkyl $C_1$–$C_8$, alkenyl $C_3$–$C_4$ or alkynyl $C_3$–$C_4$; $R_4$ and $R_5$ are the same or different and represent hydrogen or alkyl $C_1$–$C_4$, with the proviso that only one of said $R_4$ and $R_5$ can be hydroxy when the other represents hydrogen; $R_2$ and $R_3$ each represent halogen, or one is halogen and the other is hydrogen, or one is halogen and the other is lower alkyl, or both are hydrogen but only in this latter case when at least one of $R_4$ and $R_5$ is other than hydrogen; and alkali, alkaline earth metal and ammonium salts of said N-hydroxyamides.

2. N-hydroxyamides of claim 1 wherein $R_2$ and $R_3$ represent either both halogens, or one halogen and one hydrogen, or one halogen and one methyl, or both hydrogen but only in this latter case when at least one of $R_4$ and $R_5$ is other than hydrogen.

3. 4-(n-butoxy)-3 chlorophenylacethydroxamic acid.
4. 4-(n-butoxy)-3 fluorophenylacethydroxamic acid.
5. 4-allyloxy-3 chlorophenylacethydroxamic acid.
6. 4-propargyloxy-3 chlorophenylacethydroxamic acid.
7. 4-propargyloxy-3 fluorophenylacethydroxamic acid.
8. 4-propargyloxy-3 bromo-5 methylphenylacethydroxamic acid.
9. 4-allyloxy-3,5 dichlorophenylacethydroxamic acid.

References Cited

UNITED STATES PATENTS

| | | | |
|---|---|---|---|
| 2,877,156 | 3/1959 | Janssen et al. | 260—559 |
| 3,118,755 | 1/1964 | Richter | 260—559S |
| 3,187,041 | 6/1965 | Richter | 260—559 |
| 3,188,349 | 6/1965 | Krohs et al. | 260—501.17 |
| 3,189,432 | 6/1965 | Richter | 260—473 |

BERNARD HELFIN, Primary Examiner

J. E. EVANS, Assistant Examiner

U.S. Cl. X.R.

424—43; 260—247, 293, 313, 465, 473, 519, 521, 525, 544, 559, 591, 999